United States Patent [19]

Ney et al.

[11] 3,865,952

[45] Feb. 11, 1975

[54] BLUE CHEESE FLAVOR

[75] Inventors: Karl Heinz Ney, Hamburg; I. Poetoe Gde Wirotama, Rellingen; Wolfram Gustav Freytag, Halstenbek, all of Germany

[73] Assignee: Lever Brothers Company, New York, N.Y.

[22] Filed: Oct. 1, 1973

[21] Appl. No.: 402,426

Related U.S. Application Data

[63] Continuation-in-part of Ser. No. 240,817, April 3, 1972, abandoned.

[30] Foreign Application Priority Data

Apr. 8, 1971 Luxembourg............................ 62952

[52] U.S. Cl. ................................................. 426/65
[51] Int. Cl. ............................................. A23l 1/26
[58] Field of Search ............................... 426/65, 175

[56] References Cited

UNITED STATES PATENTS

| | | | |
|---|---|---|---|
| 2,920,965 | 1/1960 | Ziegler et al. | 99/140 |
| 3,034,902 | 5/1962 | Bavisotto | 426/221 X |
| 3,520,699 | 7/1970 | Henning | 426/65 |

OTHER PUBLICATIONS

Fenaroli's Handbook of Flavor Ingredients, Edited by Furia et al., 1971, The Chemical Rubber Co., Cleveland, 556, 741, 742.

*Primary Examiner*—Joseph M. Golian
*Attorney, Agent, or Firm*—Lever Brothers Company

[57] ABSTRACT

A blue cheese flavor composition is improved by incorporating 1-octen-3-ol. Other important ingredients of the composition are 2-alkanones having 5 to 15 carbon atoms; and alkanoic acids having 2 to 12 carbon atoms of which at least 80% have at least 6 carbon atoms and at most 2% are branched chain acids having 4 to 5 carbon atoms. The ratio of 1-octen-3-ol, 2-alkanones and acids is in the range of 1:(2–30):-(5–60). The ripe blue cheese flavor of a food composition to which such flavor composition is admixed, is further improved by addition of a mixture of amino acids.

4 Claims, No Drawings

BLUE CHEESE FLAVOR

This application is a continuation-in-part of application Ser. No. 240,817 filed Apr. 3, 1972, now abandoned, for which convention priority is claimed of Luxembourg patent application No. 62,952, filed Apr. 8, 1971.

The present invention relates to a blue cheese flavor composition, to a process for preparing a food stuff having a ripe blue cheese flavor which comprises admixing a blue cheese flavor composition with a food composition and to a foodstuff prepared by such process.

Blue cheese is a cheese of which the inside is ripened by the action of bluish or greenish moulds such as Penicillium roqueforti. Blue cheese can also be described as cheese streaked with mould in contrast with cheese having mould on its surface, such as Camembert (see for example J. Schormueller, Handbuch der Lebensmittelchemie III/1 (1968), (Springer Verlag, particularly pages 554–555). In Germany such cheeses streaked with mould are known as "Edelpilzkaese". Examples of relevant cheeses are Roquefort, Danish and French blue cheeses, Stilton and Gorgonzola. For the sake of convenience the name "blue cheese" will be used in this specification.

Because of its characteristic flavor, blue cheese is liked for flavoring foodstuffs. However, because of the complicated method of preparation it is comparatively expensive. Furthermore, by direct addition of blue cheese to a food composition the strength and lasting power of the flavor as well as the consistency of the product are difficult to regulate satisfactorily. Also, pieces of Roquefort and Gorgonzola have been incorporated into processed cheese, but this processed cheese has a very limited shelf life. There have also been attempts to prepare cheese with Roquefort flavor by comminuting or melting unripened raw cheese, drying it and then mixing the powder obtained with water until it has a water content suitable for the optimum growth of mould. This cheese powder was subsequently inoculated with Penicillium roqueforti and allowed to ripen for a number of weeks. The cheese powder ripened in this way was then added, alternatively after mixing with water, as a flavor agent to processed cheese. The methods described above have several disadvantages, viz, (1) products with a bad flavor are obtained, which can only be stored for a short time, or (2) a long ripening period is necessary, and in either event undesirable further ripening has to be prevented by heating processes such as hot air or infrared treatment.

As a result there has been an increasing trend towards adding a flavor composition to a food composition. Thus a blue cheese flavor cocktail has been proposed consisting of methylketones, ethanol, acetaldehyde, low molecular weight fatty acids and stabilised cottonseed oil. Other prior proposals for blue cheese flavor compositions include (a) butyl butyryl lactate, isovaleric acid, ethyl butyrate, butyric acid, ammonium isovalerate, hexanoic acid, 2-heptanone, alcohol (95%), and propylene glycol, and (b) phellandrene, butyl butyryl lactate, isovaleric acid, butyric acid, hexanoic acid, ethyl butyrate, and propylene glycol (J. Merory, Food Flavorings, 2nd Ed. 1968, Avi Publishing Company, pages 191–192, which is incorporated herein by reference). However, the cocktails known so far have the disadvantage that they smell of butyric acid and have a soapy, perfume taste. Further it is known from U.S. Pat. specification No. 3,520,699 to impart a blue cheese flavor to a food composition by adding fatty acids having 4–10 carbon atoms, one or more phenols and one or more lactones of 4-, 5-, or 6-hydroxyalkanoic acids having 4–22 carbon atoms, as well as one or more 2-alkanones having 4–17 carbon atoms, which is incorporated herein by reference. Precursors of these lactones and 2-alkanones may be used. By "precursors" whenever used in this specification, we mean substances which, when incorporated in the foodstuff, are capable of giving rise to the respective flavor ingredient with which the precursor is associated. Glycerides of hydroxyalkanoic acids are suitable as precursors of lactones of the corresponding hydroxyalkanoic acids, and 3-oxoalkanoic acids or esters thereof are suitable precursors of 2-alkanones.

It has now been found that to a food composition, in particular young cheese, processed cheese or processed cheese preparation, an improved ripe blue cheese flavor can be imparted when such food composition is admixed with a blue cheese flavor composition containing 1-octen-3-ol in addition to known cheese flavor ingredients. It has been found that 1-octen-3-ol tends to mask or to counteract the "chemical" note possessed by previous blue cheese flavor compositions. This new technical effect of a known flavor ingredient is very surprising, because 1-octen-3-ol has neither been isolated from natural cheese nor been used in cheese flavor compositions.

Accordingly the present invention provides a process for preparing a foodstuff having a ripe blue cheese flavor which comprises admixing of a blue cheese flavor composition containing an effective amount of 1-octen-3-ol with a food composition. Suitable amounts are from 0.5 to 100 mg 1-octen-3-ol per kg of the final foodstuff, but a range of from 5 to 50 mg/kg is preferable. Although it is known for many compounds that the flavor action is dependent on the optical activity of the compound, it has surprisingly been found that the use of the racemate of 1-octen-3-ol is not disadvantageous. Consequently, for economic reasons the use of the racemate is preferable. Other important ingredients of the blue cheese flavor compositions according to the present invention are 2-alkanones having from 5 to 15 carbon atoms and alkanoic acids having from 2 to 12, preferably from 4 to 10 carbon atoms.

The invention resides primarily in the use of 1-octen-3-ol in a blue cheese flavor composition.

But also 2-alkanones having from 5 to 15 carbon atoms, preferably from 5 to 9 carbon atoms, are important ingredients for a blue cheese flavor composition. In principle precursors of 2-alkanones, such as 3-oxoalkanoic acids, can be used, as long as a sufficient amount of the desired flavor compound is present in the final foodstuff. Although with only 2-heptanone a flavor similar to blue cheese can be obtained, preferably a mixture of 2-alkanones is used.

An equally important group of ingredients of the present blue cheese flavor composition is formed by alkanoic acids having from 2 to 12 carbon atoms, preferably from 4 to 10 carbon atoms. It has been found that a foodstuff having an improved blue cheese flavor can be obtained when a blue cheese flavor composition containing alkanoic acids, of which at least 80% have at least 6 carbon atoms and at most 2% are branched chain alkanoic acids having 4 or 5 carbon atoms, is admixed with a food composition.

Both 2-alkanones and alkanoic acids are known to occur in natural blue cheese, but up to now blue cheese flavor compositions which were completely acceptable were not known. The literature on cheese flavors, particularly on blue cheese flavors, has not made any suggestion that 1-octen-3-ol could have this beneficial effect on blue cheese flavor compositions.

The amount of 2-alkanones and alkanoic acids used in a blue cheese flavor composition are preferably such that in the final foodstuff the relative proportion of 1-octen-3-ol, 2-alkanones having from 5 to 15 carbon atoms, and alkanoic acids having from 2 to 12 carbon atoms is 1:(2–30):(5–60). Therefore a preferable blue cheese flavor composition is one containing from 1 to 8 parts by weight of 1-octen-3-ol, from 15 to 30 parts by weight of 2-alkanone having from 5 to 15 carbon atoms, and from 40 to 60 parts by weight of alkanoic acids having from 2 to 12 carbon atoms.

Such flavor compositions can also contain known cheese flavor ingredients selected from the group consisting of 2-oxoalkanoic acids having from 2 to 6 carbon atoms, 2-oxoalkanedioic acids having 4 or 5 carbon atoms, 2-alkanols having from 5 to 9 carbon atoms, methyl and ethyl esters of alkanoic acids having from 4 to 8 carbon atoms, and aldehydes having from 2 to 10 carbon atoms. Compounds such as methional, delta-lactones, indole and cinnamic acid can be used as well.

A further improvement of the blue cheese flavor of a foodstuff is realised when succinic acid is admixed with a food composition in an amount of from 200 to 3,000 mg per kg foodstuff.

Appropriate amounts of blue cheese flavor composition are from 300 to 3,000 mg incorporated per kg foodstuff, but an amount of 1,000–2,000 mg/kg is preferable.

Examples of suitable 2-alkanones are 2-pentanone, 2-heptanone, 2-octanone, 2-nonanone, 2-undecanone and 2-tridecanone.

Examples of suitable alkanoic acids are acetic acid, butyric acid, isobutyric acid, pentanoic acid, 3-methylbutanoic acid, hexanoic acid, heptanoic acid, octanoic acid, nonanoic acid and decanoic acid.

Examples of suitable other known cheese flavor ingredients are glyoxylic acid, pyruvic acid, 2-oxo-3-methylbutanoic acid, 2-oxo-4-methylpentanoic acid, 2-oxobutanedioic acid, and 2-oxopentanedioic acid; 2-pentanol, 2-heptanol and 2-nonanol; ethylbutanoate, methyl and ethyl hexanoate and ethyl octanoate; ethanol, propanal, butanal, pentanal and phenylethanal.

The blue cheese taste of a foodstuff is further intensified when, in addition to a blue cheese flavor composition, amino acids are admixed with a food composition. It has been found advantageous to admix glutamic acid, lysine and methione with a food composition in such a way that in the final foodstuff the concentration of each of glutamic acid, lysine and methionine is at least twice as large as that of any other free amino acid present. In this specification the term free amino acids covers both the amino acids and their salts. This can be achieved by a process in which a mixture consisting of glutamic acid, lysine and methionine and not more than 10% of other amino acids is admixed with a food composition, which percentage is based on the total amount of amino acids admixed with the food composition. A mixture containing 30–60% mono-sodium glutamate, 5–30% methionine and 65–10% lysine HCl is preferable. When such a mixture is added to a food composition which did not contain free amino acids, the relative proportions of glutamic acid, lysine and methionine in the final foodstuff will be (26–52) : (8–52) : (5–30). The amounts of amino acids admixed are preferably such that in the final foodstuff the total concentration of glutamic acid, lysine and methionine is 500–20,000 mg/kg, more preferably 3000–8000 mg/kg. Glutamic acid and lysine are used in the form of their L-isomers. Methionine can be used in the form of its L-isomer or as the racemate, i.e. DL-methionine. As stated above the amino acids as well as their salts can be used, for example monosodium glutamate or lysine HCl, but in stoechiometric amounts, which means that, for example, 147 parts glutamic acid are equivalent to 169 parts monosodium glutamate and 146 parts lysine are equivalent to 182.5 parts lysine HCl. The use of such amino acids is an example of the invention described and claimed in our co-pending application Ser. No. 407,702, a continuation-in-part of application Ser. No. 240,811, now abandoned, corresponding to Luxembourg patent application No. 62953 filed April 8, 1971.

Another aspect of the present invention is a blue cheese flavor composition comprising 1-octen-3-ol, a 2-alkanone having from 5 to 15 carbon atoms with a ratio of 1-octen-3-ol to 2-alkanone in the range of 1 : (2–30), and alkanoic acids having from 2 to 12 carbon atoms with a ratio of 1-octen-3-ol to alkanoic acids in the range of 1 : (5–60). A particularly perferable blue cheese flavor composition comprises a mixture of i. from 1 to 8 parts by weight of 1-octen-3-ol,
ii. from 15 to 30 parts by weight of 2-alkanones having from 5 to 15 carbon atoms, and
iii. from 40 to 60 parts by weight of alkanoic acids having from 2 to 12 carbon atoms, of which at least 80% contain at least 6 carbon atoms and at most 2% are branched chain alkanoic acids having 4 or 5 carbon atoms, and optionally iv. from 0 to 25 parts by weight of 2-oxoalkanoic acids having from 2 to 6 carbon atoms and 2-oxoalkanedioic acids having 4 or 5 carbon atoms,
v. from 0 to 5 parts by weight of 2-alkanols having from 5 to 9 carbon atoms,
vi. from 0 to 0.2 parts by weight of methyl and ethyl esters of alkanoic acids having from 4 to 8 carbon atoms, or
vii. from 0 to 2 parts by weight of aldehydes having from 2 to 10 carbon atoms.

A further aspect of the present invention is a foodstuff containing a blue cheese flavor composition according to the invention, in particular a foodstuff comprising the following components, in amounts expressed as mg per kg of the foodstuff:

i. from 0.5 to 100 mg/kg of 1-octen-3-ol,
ii. from 10 to 1,500 mg/kg of 2-alkanones having from 5 to 15 carbon atoms,
iii. from 25 to 2,000 mg/kg of alkanoic acids having from 2 to 12 carbon atoms, and optionally iv. from 200 to 3,000 mg/kg of succinic acid, and
v. from 0 to 1,500 mg/kg of known cheese flavor ingredients selected from the group consisting of 2-oxoalkanoic acids having from 2 to 6 carbon atoms, 2-oxoalkanedioic acids having 4 or 5 carbon atoms, 2-alkanols having from 5 to 9 carbon atoms, methyl and ethyl esters of alkanoic acids having from 4 to 8 carbon atoms and aldehydes having from 2 to 10 carbon atoms.

The most important food compositions to which the flavor of ripe blue cheese is imparted according to the invention are the following cheese products: young cheese, processed cheese, particularly processed cheese prepared from young, relatively tasteless raw cheese, processed cheese preparation, quark, margarine cheese, creamed cheese, cheese fondu, cheese powder or the like. However, the blue cheese flavor compositions according to the invention can also be admixed with other food compositions in which a blue cheese flavor is desired, for example soups, sauces, pies, sandwich spreads, cheese pastries, pizza or similar food compositions.

In this specification percentages, aprts and ratios are by weight, unless otherwise stated. The invention is illustrated by the following examples without being limited thereto.

A–E

Blue cheese flavor compositions A, B, C, D and E were made by mixing of

EXAMPLE 1

From 100 g young Cheddar, 64 g water and 3 g melting salt (a mixture of commercially used polyphosphates) a processed cheese was prepared in a casserole under stirring and careful heating up to 80°C. To the melted mass 175 mg (i.e. about 1000 mg/kg) of blue cheese flavor composition A was added. Stirring was continued for 10 minutes at 80°C and subsequently the mixture was allowed to cool. In this way a processed cheese having an attractive blue cheese flavor was obtained.

EXAMPLE 2

The procedure of Example 1 was repeated, except that simultaneously with the blue cheese flavor composition A 600 mg (i.e. about 4000 mg/kg) of the mixture of amino acids F was added. The melted mass was again stirred for 10 minutes at 80°C, and subsequently allowed to cool, giving a processed cheese with a full-rounded blue cheese taste, which was hardly to distinguish from a natural blue cheese product.

|  | A | B C D E | B/E |
|---|---|---|---|
| 1-octen-3-ol | 22.651 | + + + + | 51.00 |
| 2-pentanone | 9.050 | + + + + | 20.40 |
| 2-heptanone | 63.403 | + + + + | 142.80 |
| 2-nonanone | 116.406 | + + + + | 262.14 |
| 2-undecanone | 9.734 | + + + + | 21.93 |
| 2-tridecanone | 2.133 | + + + + | 4.79 |
| acetic acid | 8.501 | – – – – | — |
| butyric acid | 6.450 | + + + + | 14.54 |
| isobutyric acid | 2.133 | + + + + | 4.80 |
| pentanoic acid | 2.983 | + + + + | 6.73 |
| 3-methylbutanoic acid | 2.800 | + + + + | 6.32 |
| hexanoic acid | 264.964 | + + + + | 596.70 |
| heptanoic acid | 5.434 | + + + + | 12.24 |
| octanoic acid | 89.005 | + + + + | 200.43 |
| nonanoic acid | 4.550 | + + + + | 10.25 |
| decanoic acid | 133.607 | + + + + | 300.90 |
| glyoxylic acid | 70.887 | – – – – | — |
| pyruvic acid | 20.435 | – – – – | — |
| 2-oxo-3-methylbutanoic acid | 17.220 | – – – – | — |
| 2-oxo-4-methylpentanoic acid | 43.252 | – – – – | — |
| 2-oxo-butanedioic acid | 51.186 | – – – – | — |
| 2-oxopentanedioic acid | 42.569 | – – – – | — |
| 2-pentanol | — | + + + – | 14.23 |
| 2-heptanol | — | + + + – | 1.79 |
| 2-nonanol | — | + + + – | 22.24 |
| ethyl butanoate | — | + – + + | 1.02 |
| ethyl hexanoate | — | + – + + | 1.02 |
| ethyl octanoate | — | + – + + | 1.02 |
| ethanal | — | + + – + | 10.20 |
| propanal | — | + + – + | 5.10 |
| butanal | — | + + – + | 5.10 |
| pentanal | — | + + – + | 5.10 |
| phenylethanal | — | ° + – + | 5.10 |
| methional | 0.090 | + – + + | 0.20 |
| 5-decanolide | 0.707 | – – – – | — |
| 5-dodecanolide | 0.707 | – – – – | — |
| indole | 0.113 | – – – – | — |
| cinnamic acid | 0.030 | – – – – | — |

The figures for composition A indicate parts per thousand of flavor composition, and the figures for B/E indicate parts by weight for those compounds which are present in compositions B, C, D or E (indicated by +).

F

A mixture of amino acids was made by mixing of 435 parts monosodium L-glutamate, 377 parts L-lysine.HCl and 188 parts DL-methionine.

COMPARATIVE EXAMPLE C I

Example 2 was repeated, except that a blue cheese flavor composition was used which only differed from composition A in that it did not contain 1-octen-3-ol. Although the processed cheese had a flavor similar to blue cheese, the overall flavor of the product was considered less than that of Example 2; in particular some experts judged the flavor to have a synthetic, chemical note.

EXAMPLES 3–6

The procedure of Example 1 was repeated, except that the blue cheese compositions B, C, D and E were used, respectively. All products had a typical blue cheese flavor, but the product containing composition B was preferred.

EXAMPLE 7

From 100 g young Cheddar and 3 g melting salt and 64 g water a processed cheese was prepared by stirring at 80°C and addition of 800 mg (i.e. about 6000 mg/kg) of the mixture of amino acids F and 220 mg (i.e. about 1320 mg/kg) blue cheese flavor composition B and 60 mg (i.e. about 400 mg/kg) succinic acid. After stirring for 15 minutes followed by cooling a processed cheese was obtained having an intensive and fully-rounded blue cheese flavor.

EXAMPLE 8

A processed cheese containing 50% dry matter and 60% fat in the dry matter was prepared from skim milk curd, butter and melting salts. After addition of 1% sodium chloride and 5000 mg/kg of the mixture of amino acids F and 1750 mg/kg of blue cheese flavor composition A, a product having a very attractive and rounded blue cheese flavor was obtained.

COMPARATIVE EXAMPLE C II

A processed cheese was prepared in conventional manner from 90% young Cheddar, 10% Danish blue and melting salts. Although the greenish mould particles were visible, the product had a weak flavor of blue cheese.

EXAMPLE 9

To the product of Comparative Example C II were admixed 500 mg/kg blue cheese flavor composition C and 4000 mg/kg of the mixture of amino acids F. The resulting product had a clearly more intensive and rounded blue cheese flavor.

EXAMPLE 10

150 g young Cheddar, comminuted in a mincing machine, 4.5 g melting salt and 1.2 g (i.e. about 3000 mg/kg) of the mixture of amino acids F were heated au bain-marie while 0.25 l hot milk was added slowly. Subsequently 0.5 g sodium chloride and 0.3 g (i.e. about 750 mg/kg) blue cheese flavor composition D were added together with pepper to taste. In this way a creamed cheese sauce was obtained having a very good blue cheese taste.

What is claimed is:

1. A blue cheese flavor composition which comprises a mixture of:
   i. from 1 to 8 parts by weight of 1-octen-3-ol,
   ii. from 15 to 30 parts by weight of 2-alkanones having from 5 to 15 carbon atoms,
   iii. from 40 to 60 parts by weight of alkanoic acids having from 2 to 12 carbon atoms, of which at least 80% contain at least 6 carbon atoms and at most 2% are branched chain alkanoic acids having 4 or 5 carbon atoms,
   iv. from 0 to 25 parts by weight of 2-oxoalkanoic acids having from 2 to 6 carbon atoms and 2-oxoalkanedioic acids having 4 or 5 carbon atoms,
   v. from 0 to 5 parts by weight of 2-alkanols having from 5 to 9 carbon atoms,
   vi. from 0 to 0.2 parts by weight of methyl and ethyl esters of alkanoic acid having from 4 to 8 carbon atoms, and
   vii. from 0 to 2 parts by weight of aldehydes having from 2 to 10 carbon atoms.

2. A foodstuff having a blue cheese flavor which comprises a food composition selected from the group consisting of young cheese and processed cheese and (b) a blue cheese flavor composition in which the blue cheese flavor comprises the following components:
   i. from 0.5 to 100 mg/kg of 1-octen-3-ol,
   ii. from 10 to 1,500 mg/kg of 2-alkanones having from 5 to 15 carbon atoms,
   iii. from 25 to 2,000 mg/kg of alkanoic acids having from 2 to 12 carbon atoms, of which at least 80% contain at least 6 carbon atoms and at most 2% are branched chain alkanoic acids having 4 or 5 carbon atoms,
   iv. from 0 to 3,000 mg/kg of succinic acid, and
   v. from 0 to 1,500 mg/kg of cheese flavor ingredients selected from the group consisting of 2-oxoalkanoic acids having from 2 to 6 carbon atoms, 2-oxoalkanedioic acids having 4 or 5 carbon atoms, 2-alkanols having from 5 to 9 carbon atoms, methyl and ethyl esters of alkanoic acids having from 4 to 8 carbon atoms and aldehydes having from 2 to 10 carbon atoms.

3. A foodstuff according to claim 2, comprising additionally glutamic acid, lysine and methione in relative proportions of (26–52) : (8–52): (5–30), the total amount of glutamic acid, lysine and methione being from 500 to 20,000 mg per kg of foodstuff.

4. A foodstuff according to claim 2 in which the total amount of the components selected from the group consisting of (i) to (v) is from 300 to 3,000 mg per kg of the foodstuff.

* * * * *